US012690570B2

(12) United States Patent
Broers et al.

(10) Patent No.: US 12,690,570 B2
(45) Date of Patent: Jul. 28, 2026

(54) FEEDING SYSTEM WITH UV-B LIGHT SOURCE FOR A LIVESTOCK ANIMAL

(71) Applicant: SIGNIFY HOLDING B.V., Eindhoven (NL)

(72) Inventors: Harry Broers, 'S-Hertogenbosch (NL); Marc Andre De Samber, Lommel (BE)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/851,256

(22) PCT Filed: Mar. 24, 2023

(86) PCT No.: PCT/EP2023/057664
§ 371 (c)(1),
(2) Date: Sep. 26, 2024

(87) PCT Pub. No.: WO2023/186741
PCT Pub. Date: Oct. 5, 2023

(65) Prior Publication Data
US 2025/0169475 A1    May 29, 2025

(30) Foreign Application Priority Data
Mar. 31, 2022    (EP) .................................... 22165754

(51) Int. Cl.
A01K 29/00        (2006.01)
A01K 5/01        (2006.01)
(Continued)

(52) U.S. Cl.
CPC ................ A01K 29/00 (2013.01); A01K 5/01 (2013.01); A01K 5/02 (2013.01); *A01K 39/00* (2013.01)

(58) Field of Classification Search
CPC ...... A01K 29/00; A01K 29/005; A01K 31/00; A01K 31/02; A01K 31/18; A01K 31/22; A01K 45/00
See application file for complete search history.

(56) References Cited

U.S. PATENT DOCUMENTS

| | | | |
|---|---|---|---|
| 2008/0017120 A1* | 1/2008 | Hawk ................ | A01K 39/0213 119/72 |
| 2015/0164051 A1* | 6/2015 | Otto-Luebker .... | A01K 39/0125 119/51.11 |

(Continued)

FOREIGN PATENT DOCUMENTS

| | | |
|---|---|---|
| DE | 10350844 A1 | 6/2005 |
| DE | 102015117299 A1 | 4/2016 |

(Continued)

*Primary Examiner* — Joshua J Michener
*Assistant Examiner* — Nicole Page Maccrate

(57) ABSTRACT

An ultraviolet light system (120) and a consumable product provider (110) together provide a consumable product system (100) in which the ultraviolet light system (120) illuminates a specific portion of a livestock animal (190) near or using the consumable product provider (110) with ultraviolet light (525) having a wavelength of between 280 nm and 320 nm, wherein the portion of the livestock animal (190) is a portion of the head of the livestock animal or the feet, leg and/or shank of the livestock animal (190).

20 Claims, 6 Drawing Sheets

(51) Int. Cl.
_A01K 5/02_ (2006.01)
_A01K 39/00_ (2006.01)

(56) References Cited

U.S. PATENT DOCUMENTS

2016/0089548 A1* 3/2016 Kaas ................... A61N 5/0613
                                                    607/94
2017/0000163 A1    1/2017 Grajcar
2017/0280687 A1* 10/2017 Vrabete ............... A01K 29/005
2024/0381850 A1* 11/2024 Stephan ............. A01K 29/005

FOREIGN PATENT DOCUMENTS

WO      WO-2009123445 A1 * 10/2009  .............. A01K 1/12
WO         2021223918 A1    11/2021

* cited by examiner

FEEDING SYSTEM WITH UV-B LIGHT SOURCE FOR A LIVESTOCK ANIMAL

CROSS-REFERENCE TO PRIOR APPLICATIONS

This application is the U.S. National Phase application under 35 U.S.C. § 371 of International Application No. PCT/EP2023/057664, filed on Mar. 24, 2023, which claims the benefit of European Patent Application No. 22165754.7, filed on Mar. 31, 2022. These applications are hereby incorporated by reference herein.

FIELD OF THE INVENTION

The present invention relates to the field of livestock farming, and in particular to systems for use in livestock farming.

BACKGROUND OF THE INVENTION

With an ever-growing population, there is an increasing interest in industrial farms that are used to rear and raise livestock, such as poultry (e.g. chickens, ducks or turkeys), pigs, cattle, sheep and other farm animals. Typically, livestock are housed and fed in livestock stables. For poultry, such livestock stables are often labelled coops.

There is a desire to improve the health and welfare of livestock, which has been shown to have a positive outcome on commodities produced or resulting from raising the livestock. One area of interest is ensuring suitable vitamin and nutritional acquisition by the livestock.

Vitamin D is an important nutrient for a large number of livestock. A vitamin D deficiency in young livestock can cause rickets, resulting in deformities. For chickens, a vitamin D deficiency adversely affects egg production and can cause calcium deficiency.

In general, there are two routes for a livestock animal to acquire vitamin D, by ingestion of it in feed or by direct (skin) exposure to ultraviolet light. However, sunlight that comes through ordinary window glass is ineffective for the production of vitamin D in skin, since such glass does not allow penetration of ultraviolet light used to generate vitamin D. Moreover, it is common for stables such as chicken coops to not even have windows and hence no natural light inflow.

To overcome this issue, it is common to supplement livestock feed with vitamin D. This can prove costly to carry out over a large livestock population, and it is difficult to ensure an even distribution of vitamin throughout the livestock population. Moreover, the pathways and the resulting vitamin D components and derivates are different for exogenous and endogenous vitamin D, with a possible favoring outcome for the endogenous method.

Another approach is to provide artificial ultraviolet light that illuminates the livestock stable (as general illumination or flood exposure). However, ultraviolet light can degrade materials and trigger undesirable social behavior in livestock animal. Employing such ultraviolet light as general illumination with flood exposure of the livestock stable may also be energy inefficient due to high power consumption.

There is therefore a desire for an improved mechanism for providing a livestock animal with vitamin D.

SUMMARY OF THE INVENTION

The invention is defined by the claims.

According to examples in accordance with an aspect of the invention, there is provided a consumable product system configured for illuminating a livestock animal with ultraviolet light.

The consumable product system comprises: a consumable product provider configured to provide consumable product for consumption by the livestock animal; and an ultraviolet lighting system configured to illuminate a portion of the livestock animal with ultraviolet light whilst the livestock animal is consuming consumable product at the consumable product provider and/or is proximate to the consumable product provider, wherein the ultraviolet light has a peak intensity at a wavelength of from 280 nm to 320 nm.

The present disclosure proposes to illuminate a livestock animal with (artificial) ultraviolet light whilst the livestock animal is consuming consumable product. The ultraviolet light has a peak intensity at a wavelength between 280 nm and 320 nm, which has been identified as being suitable for promoting the generation of vitamin D within the skin of the livestock.

The portion of the livestock animal is a portion of the head of the livestock animal or the feet, leg and/or shank of the livestock animal.

One innovative recognition is that the length of time that an animal spends consuming certain consumable products (e.g., food or liquid) is roughly the same amount of time required for exposure to ultraviolet light to achieve adequate vitamin D generation by the livestock animal for improved welfare. Thus, by illuminating the livestock during consumption of consumable product, appropriate vitamin D generation is provided. Excess ultraviolet illumination might lead to unwanted animal behavior and/or potential damage to the livestock and/or apparatus.

Moreover, it has been recognized that the length of time that an animal spends consuming certain consumable products is relatively consistent from day to day. Thus, it is possible to control the daily exposure of the livestock animal to ultraviolet light with a high degree of accuracy, reliability and repeatability. This facilitates more nuanced, accurate and repeatable control over the (daily) exposure of ultraviolet light to livestock, and therefore the generation of vitamin D, than previously possible.

In the context of the present disclosure, consumable product comprises any sustenance or nutrition that can be consumed and/or ingested by livestock, e.g., food, liquid (such as water, liquid feed or milk), vitamins or medication. The term livestock refers to any animal farmed for commodities, such as cattle, sheep, poultry (e.g. chickens or turkeys), swine and so on.

A peak intensity at a wavelength represents the wavelength for which the maximum intensity (e.g., luminance) of ultraviolet light is output or emitted by the ultraviolet light system.

Ultraviolet light having a wavelength of between 280 nm and 320 nm (commonly called UV-B) has been identified as being particularly instrumental in the generation of vitamin D in epidermal cells (such as those found in the skin) of a livestock animal. Thus, improved vitamin D generation is promoted through use of UV light having such wavelengths.

The ultraviolet light may have a peak intensity at a wavelength of from 280 nm to 315 nm. This range has been identified as being even more influential on the generation of vitamin D. An even more preferred range is from 300 nm to 315 nm. An alternative range is from 290 mn to 310 nm.

The ultraviolet light system may be configured to, whilst the livestock animal is consuming consumable product at the consumable product provider, illuminate the portion of the livestock animal with ultraviolet light having an irradiance, on the portion of the livestock animal, greater than 0.001 W/m².

In some examples, the consumable product provider defines a consuming zone in which the head or feet of the livestock animal is to be positioned during consumption of the consumable product; and the ultraviolet light system is configured to illuminate the consuming zone with ultraviolet light having an irradiance, on the head or feet of the livestock animal in the consuming zone, greater than 0.001 W/m².

The irradiance of the ultraviolet light may be configured to achieve, for an estimated time that the livestock animal will be at or near the consumable product provider, a desired ultraviolet exposure, typically measured in J/m² or number of SEDs (1 SED being equal to 100 J/m²). It is recognized that the recommended exposure limit or recommended exposure amount for different types/breeds/ages/species of animal, or for targeting different effects in such animals, are different, and it is possible to control the amount of exposure by controlling the irradiance of the ultraviolet light.

In some examples, the ultraviolet light system may be configured to, whilst the livestock animal is consuming consumable product at the consumable product provider, illuminate the portion of the livestock animal with ultraviolet light having an illuminance, on the portion of the livestock animal, of no more than 50 lux, preferably no more than 25 lux, preferably no more than 15 lux In some examples, the ultraviolet light system may be configured to, whilst the livestock animal is consuming consumable product at the consumable product provider, illuminate the portion of the livestock animal with ultraviolet light having an illuminance, on the portion of the livestock animal, of no less than 1 lux, preferably no less than 5 lux, preferably no less than 10 lux.

The consumable product system may further comprise a livestock sensor configured to sense the presence or absence of the livestock animal within the vicinity of the consumable product provider, wherein the ultraviolet lighting system is configured to only emit ultraviolet light responsive to the livestock sensor sensing the presence of the livestock animal within the vicinity of the consumable product provider.

Only providing the ultraviolet light when the livestock animal is within the vicinity of the consumable product provider improves the (power) efficiency of the ultraviolet lighting system as well as reducing a risk of damaging the livestock and/or apparatus with unnecessary ultraviolet light.

As previously mentioned, the amount of time for which an animal is consumable the consumable product is approximately the same as the length of time required to illuminate the livestock animal with ultraviolet light to achieve suitable vitamin D generation. By restricting the emission of ultraviolet light to only be provided when the livestock animal is near the provider, excess ultraviolet light is avoided.

It will be apparent that such an ultraviolet lighting system is configured to restrict or prevent the emission of ultraviolet light responsive to the livestock sensor sensing the absence of the livestock animal within the vicinity of the consumable product provider As partly mentioned: The portion of the livestock animal may be a portion of the head of the livestock animal or the feet, leg or shank of the livestock animal. Many forms of livestock are covered or coated with fur, hair or feathers that would limit the amount of ultraviolet light that reaches the skin of the livestock (for generating vitamin D). The head and feet of the livestock animal is usually less sparsely coated, such that ultraviolet light incident on these portions is more likely to result in the production of vitamin D.

This embodiment thereby improves the generation of vitamin D in the livestock animal.

Proposed approaches are particularly advantageous for (feathered) poultry, compared to general illumination mechanism for providing UV-B light, because general illumination cannot effectively and/or efficiently reach the poultry due to the feathers of the poultry and the distance of poultry to light sources when employing general illumination. Hence, the present invention is particularly advantageous for poultry.

The livestock animal may be a chicken and the portion of the head of the livestock animal may include a comb, a huddle or huddles, a cheek or cheeks, a beak, a mouth, an eye area, a foot or feet, a leg or legs, a shank or shanks, and/or an outer ear surface of the chicken. These areas have been identified as being particularly exposed and/or sensitive to incident ultraviolet light in the generation of vitamin D from incoming ultraviolet light. The eye area is preferably an area surrounding the eye.

In some examples, the consumable product provider comprises a nipple for delivering liquid to the livestock animal; and the ultraviolet light system is configured to emit the ultraviolet light in or near the nipple.

In at least one example, the consumable product provider comprises a plurality of nipples for delivering liquid to the livestock animal; and the ultraviolet light system is configured to emit the ultraviolet light at a position between the plurality of nipples.

The ultraviolet light system may comprise a light guide configured to guide the ultraviolet light towards an inner part of a mouth or beak of the livestock animal whilst the livestock animal is consuming consumable product at the consumable product provider.

This embodiment provides targeted illumination of the inside of the mouth or beak of the livestock animal. As the inner side of the mouth is lined with oral mucosa, photochemical vitamin D generation can be triggered inside the mouth/beak. This embodiment reduces the exposure of ultraviolet light externally to the livestock animal, reducing potential damage to apparatus and/or undesirable illumination of other livestock animals (e.g., not currently consuming consumable product), which might otherwise lead to excess ultraviolet illumination. This approach also reduces a likelihood of ultraviolet light illuminating an eye of the livestock animal, which can cause damage to the eye(s).

The ultraviolet system may comprise an output surface configured to emit the ultraviolet light, wherein the output surface is located no further than 0.5 m from the consumable product provider. Positioning the output surface to be proximate to the consumable product provider reduces a required luminance for a light source of the ultraviolet lighting system, improving an efficiency of the system and reducing power costs.

The output surface is preferably located no further than 0.25 m from the consumable product provider.

The consumable product system may further comprise a livestock identifier configured to determine an identity of the livestock animal, wherein the ultraviolet lighting system is configured to control one or more properties of the ultraviolet light responsive to the determined identity of the livestock animal.

5

6

In this way, different animals may be illuminated with different amounts or intensities of ultraviolet light. This allows individual variation in livestock to be taken into account (e.g., variations in fur/feather coverage, variations in skin sensitivity in vitamin D generation and so on) when controlling with how much ultraviolet light to illuminate the livestock animals.

The ultraviolet lighting system may be configured such that the livestock animal receives the ultraviolet light for between 5 and 60 minutes per day.

In some examples, the consumable product provider comprises/is a trough for providing feed to the livestock animal. Other suitable consumable product providers will be apparent to the skilled person, e.g., water troughs, feeding pens and so on.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
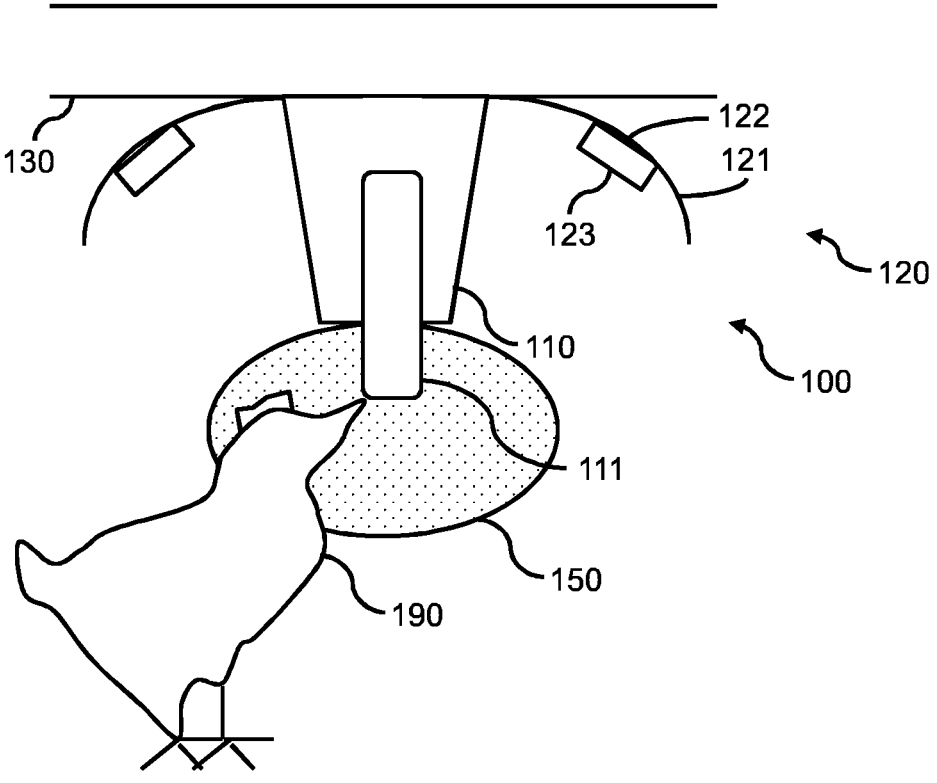
FIG. 1 illustrates a consumable product system according to an embodiment.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a mechanism for illuminating a livestock animal with ultraviolet light having a wavelength of between 280 nm and 320 nm. An ultraviolet light system and a consumable product provider together provide a consumable product system in which the ultraviolet light system illuminates animals near or using the consumable product provider.

Embodiments are based on the recognition that a livestock animal must near a consumable product provider (e.g., a trough or water nipple) during the course of a day. Thus, the position consumable product provider defines a position at which each livestock animal must be present throughout the day. Providing ultraviolet-B light (UV light having a wavelength of between 280 nm and 320 nm) at this position thereby guarantees illumination of the livestock animal during the day.

It has also been recognized that the amount of time that a livestock animal is near or at a consumable product provider is almost or exactly equal to the length of time that the animal should be illuminated with UV-B light for promotion of vitamin-D generation in the livestock animal. The proposed consumable product system thereby provides a mechanism for repeatable and reliable illumination of the livestock animal for achieving desired vitamin-D generation.

It has been further recognized that the length of time (e.g., per day or hour) that a livestock animal is at or near a consumable product provider is relatively consistent throughout the course of a day and/or week. Providing UV-B light at the consumable product provider thereby ensure consistent illumination of the livestock animal with UV-B light, promoting reliable and regular generation of vitamin D over a long period. This recognition also means that controlling the illuminance or intensity of ultraviolet light can achieve consist and repeatable control of the daily exposure of the livestock animal(s) to ultraviolet light, and therefore consist and repeatable control of the daily generation of vitamin D.

Disclosed approaches may be employed in any suitable environment for raising or keeping livestock, such as in stables and/or coops (which are themselves a type of stable).

In the context of the present disclosure, a consumable product system is any system that contains a consumable product provider (e.g., a trough, water nipple or other mechanism for providing feed/liquid to a livestock animal) and an ultraviolet lighting system for directing ultraviolet light towards livestock near/at the consumable product provider.

FIG. 1 illustrates a consumable product system 100 according to an embodiment. The consumable product system comprises a consumable product provider 110 and an ultraviolet lighting system 120.

The consumable product provider 110 is configured to provide consumable product for consumption by a livestock animal 190 (e.g., a chicken or other poultry animal). Consumable product is any product that can be consumed by the livestock animal, e.g., feed, liquid (e.g., water or liquid nutrition) or even medication.

In the illustrated example, the consumable product provider 110 comprises a nipple 111 that provides water or other liquid(s) to the livestock animal 190. In particular, the consumable product provider 110 is fluidly connected to a water line 130 that carries water (or another liquid). The livestock animal 190 is able to interact with the nipple 111 to cause the release of water from the consumable product provider 110.

The ultraviolet lighting system 120 is configured to illuminate a portion of the livestock animal with ultraviolet light whilst the livestock animal is consuming consumable product at the consumable product provider and/or is proximate to the consumable product provider.

In the context of the present invention, "proximate to" indicates within a predetermined range of the consumable product provider, e.g., within 1 m of the consumable product provider or within 0.5 m of the consumable product provider. The extent of the range may depend upon the type and/or size of the livestock animal for which the consumable product system is designed. For instance, the range may be larger for larger animals than for smaller animals.

More particularly, the ultraviolet lighting system may be configured to only illuminate a portion of the livestock animal with ultraviolet light whilst the livestock animal is consuming consumable product at the consumable product provider and/or is proximate to the consumable product provider. This can be achieved through appropriate positioning and configuring of the ultraviolet lighting system, and particularly the direction and spread of ultraviolet light emitted by the ultraviolet lighting system.

The ultraviolet lighting system may be configured to direct emitted ultraviolet light to the portion of the livestock animal consuming consumable product at the consumable product provider and/or is proximate to the consumable product provider (e.g., within 1 m of the consumable product provider).

In some examples, the ultraviolet lighting system may be configured so that more than 50% (e.g., more than 75%, e.g., more than 90%) of ultraviolet light emitted by the ultraviolet lighting system is incident upon the portion of the livestock animal consuming consumable product at the consumable product provider and/or proximate to the consumable product provider.

The understanding of the term "proximate to" and the listed potential restrictions for achieving this can be applied to any herein described embodiment of a consumable product provider and/or ultraviolet lighting system.

With continued reference to FIG. 1, the ultraviolet lighting system 120 may comprise an ultraviolet emitting device 121 (e.g., an ultraviolet light source) and an optional reflector 122. The reflector 122 is configured to direct the ultraviolet light emitted by the ultraviolet emitting device towards the livestock animal 190 whilst the livestock animal is consuming the consumable product.

The ultraviolet lighting system 120 is here positioned externally, but proximate, to the nipple 111. In this way, the ultraviolet light system is configured to emit the ultraviolet light near the nipple to thereby illuminate the livestock animal drinking or feeding at the nipple 111.

In a modified example, the ultraviolet lighting system may be positioned between two different nipples connected to a same liquid line 130. Thus, the consumable product provider may comprises a plurality of nipples for delivering liquid to the livestock animal; and the ultraviolet light system may be configured to emit the ultraviolet light at a position between the plurality of nipples.

The ultraviolet system has an output surface 123 that is configured to emit the ultraviolet light. Preferably, this output surface is located no further than 0.5 m from the consumable product provider, more particularly, the location at which the consumable product is made available for consumption (e.g., the exit of the nipple 111). Preferably, the output surface is located no further than 0.25 m from the consumable product provider, and more particularly, from the location at which the consumable product is made available for consumption.

Positioning the output surface to be proximate to the consumable product provider reduces a required luminance for a light source of the ultraviolet lighting system, improving an efficiency of the system and reducing power costs.

Of course, and as illustrated, the ultraviolet lighting system may comprise a plurality of output surfaces from which the ultraviolet light is emitted (e.g., from separate ultraviolet light sources). Preferably, each output surface is located no further than 0.5 m from the consumable product provider, and more particularly, from the location at which the consumable product is made available for consumption (e.g., the exit of the nipple 111). Preferably, the output surface is located no further than 0.25 m from the consumable product provider, and more particularly, from the location at which the consumable product is made available for consumption.

The ultraviolet light has a peak intensity at a wavelength of from 280 nm to 320 nm. In other words, the wavelength at which the intensity of the ultraviolet light peaks lies between 280 nm and 320 nm inclusive. In this way, the ultraviolet light is ultraviolet-B light.

It has been recognized that ultraviolet light falling within these wavelengths stimulates the production of vitamin-D in livestock animals, particularly by epidermal cells found on at least the skin of animals. The length of time that an animal spends consuming certain consumable products (e.g., food or liquid) is roughly or approximately the same amount of time required for sufficient exposure to ultraviolet light to achieve adequate vitamin D generation by the livestock animal. By illuminating the livestock during consumption of consumable product, appropriate vitamin D generation is provided.

Excess ultraviolet illumination might lead to unwanted animal behavior and/or potential damage to the livestock and/or apparatus.

Figure 2:
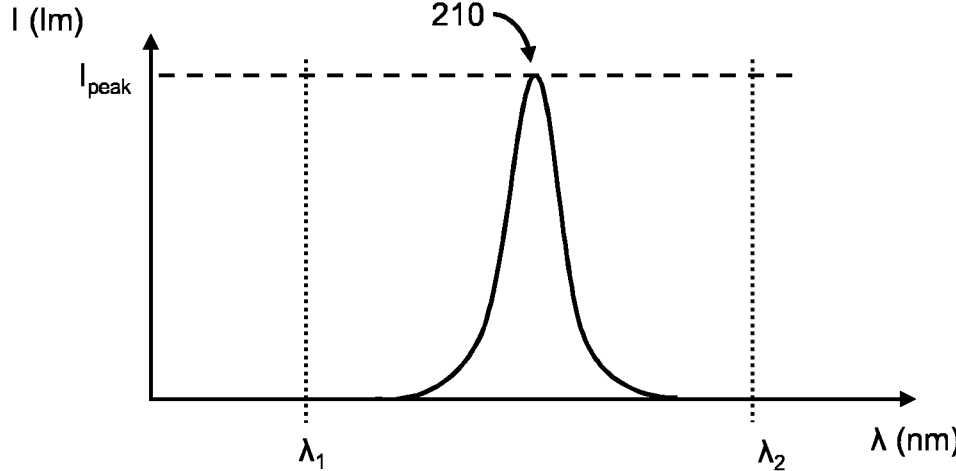
FIG. 2 illustrates a spectrum of emitted ultraviolet light.

FIG. 2 is a graph illustrating the wavelength of the ultraviolet light emitted by the ultraviolet lighting system. The x-axis demonstrates a wavelength $\lambda$ of the ultraviolet light in nm, and the y-axis demonstrate an intensity I of the ultraviolet light in lumens.

A peak intensity $I_{peak}$ occurs at a peak intensity wavelength $\lambda_{peak}$—represented by peak 210. The peak intensity $I_{peak}$ represents the maximum value for the intensity I of the ultraviolet light. The peak intensity wavelength $\lambda_{peak}$ falls within a first wavelength range, spanning from a first wavelength $\lambda_1$ to a second wavelength $\lambda_2$.

The value of the first wavelength $\lambda_1$ may be equal to 280 nm. The value of the second wavelength may be equal to 320 nm. Thus, the peak intensity wavelength $\lambda_{peak}$ falls between 280 nm and 320 nm inclusive.

Other suitable example values for the first and second wavelengths will be apparent. The first wavelength may be greater than or equal to 280 nm. The second wavelength may be less than or equal to 320 nm, e.g., less than or equal to 315 nm, e.g., 315 nm. The value of the first and second wavelengths are preferably selected to improve the stimulation of vitamin-D product in the livestock animal illuminated using the ultraviolet light.

The value of the first wavelength may be a value between 280 nm and 300 nm inclusive. The value of the second wavelength may be a value between 310 nm and 320 nm inclusive. These provide particularly useful wavelengths for promoting or triggering the generation of vitamin D in/by epidermal cells.

In one example, the value of the first wavelength is equal to 280 nm and the value of the second wavelength is equal to 315 nm. In another example, the value of the first wavelength is equal to 280 nm and the value of the second wavelength is equal to 310 nm.

In another example, the value of the first wavelength is equal to 290 nm and the value of the second wavelength is equal to 320 nm. In another example, the value of the first wavelength is equal to 290 nm and the value of the second wavelength is equal to 315 nm. In another example, the value of the first wavelength is equal to 290 nm and the value of the second wavelength is equal to 310 nm.

In another example, the value of the first wavelength is equal to 295 nm and the value of the second wavelength is equal to 320 nm. In another example, the value of the first wavelength is equal to 295 nm and the value of the second wavelength is equal to 315 nm. In another example, the value of the first wavelength is equal to 295 nm and the value of the second wavelength is equal to 310 nm.

In another example, the value of the first wavelength is equal to 300 nm and the value of the second wavelength is equal to 320 nm. In another example, the value of the first wavelength is equal to 300 nm and the value of the second wavelength is equal to 315 nm. In another example, the value of the first wavelength is equal to 300 nm and the value of the second wavelength is equal to 310 nm.

It will be appreciated that the ultraviolet light may comprise a spectrum of ultraviolet light (e.g., with emissions within a predetermined band of wavelengths). The predetermined band of wavelength may be equivalent to the first wavelength range.

Philips® lighting produce a number of suitable ultraviolet light sources that emit ultraviolet light meeting these criteria. A narrowband light source is configured to output light with a wavelength of 305 nm to 315 nm, with a peak at 311 nm. A broadband light source is configured to output light with a wavelength of 290 nm to 320 nm, with a peak at 302 nm. Either of these light sources may act as suitable light sources for use in an ultraviolet lighting system.

In particularly preferable examples, UVB LED light sources are used. These LED light sources often having well defined and distinct emission wavelengths.

One suitable light source is described by International Patent Application having publication number WO 2010/016009 A1. Other suitable light sources are well known to the skilled person, such as the range of UV-B Narrowband PLL/PL-S lamps made available by Philips® lighting (e.g., the lamp having product identifier PL-S 9W/01/2P 1CT/6X10BOX).

Turning back to FIG. 1, the ultraviolet light system 120 may be configured to direct light towards a particular portion of the livestock animal whilst the livestock animal is consuming consumable product at the consumable product provider. Directing light may be achieved through appropriate configuration of the ultraviolet light emitting device 121 and/or the (optional) reflector 122.

More particularly, the particular portion of the livestock animal is preferably a portion of the animal that comprise exposed skin, e.g., skin that is not or less covered by protective features or coverage such as feathers, hair, fur, pelage, scales and so on. This approach thereby provides more effective or efficient (e.g., more energy efficient) stimulation of the production of vitamin-D in livestock animals.

As a first example, and as illustrated, the ultraviolet lighting system 120 may be configured to illuminate at least a head of the livestock animal 120. By doing so, preferably the comb, huddles, cheeks, area around the eyes, and outer ear surface of the livestock animal (here: a chicken) can be irradiated. These are the parts of the head that are 'open' to be exposed, being less covered or hidden by blocking feathers.

As a second example, the ultraviolet lighting system 120 may be configured to illuminate the leg(s), shank(s) and/or foot/feet of the livestock animal. Typically, these areas of livestock animals are less covered with protective features, such that illuminating these areas would encourage and improve the stimulation of vitamin-D generation in the livestock animal. Suitable modifications to the position of an ultraviolet lighting system can be readily achieved for illuminating the leg(s), shank(s) and/or foot/feet of the livestock animal, e.g., positioning a light output surface near the feet via a horizontal light beam near the floor of livestock stable/coop. A more complete example of this approach is provided later in the disclosure.

The consumable product provider 110 may define a consuming zone 150 in which the portion of the livestock animal (e.g., the head of the livestock animal, the foot/feet of the livestock animal or the entire livestock animal) is to be positioned during consumption of the consumable product.

The ultraviolet light system may be configured to direct ultraviolet light towards the consuming zone, to thereby illuminate the portion of the livestock animal. The ultraviolet light system is configured to illuminate the consuming zone with ultraviolet light having an irradiance, on the portion of the livestock animal in the consuming zone, greater than 0.001 W/m².

Figure 3:
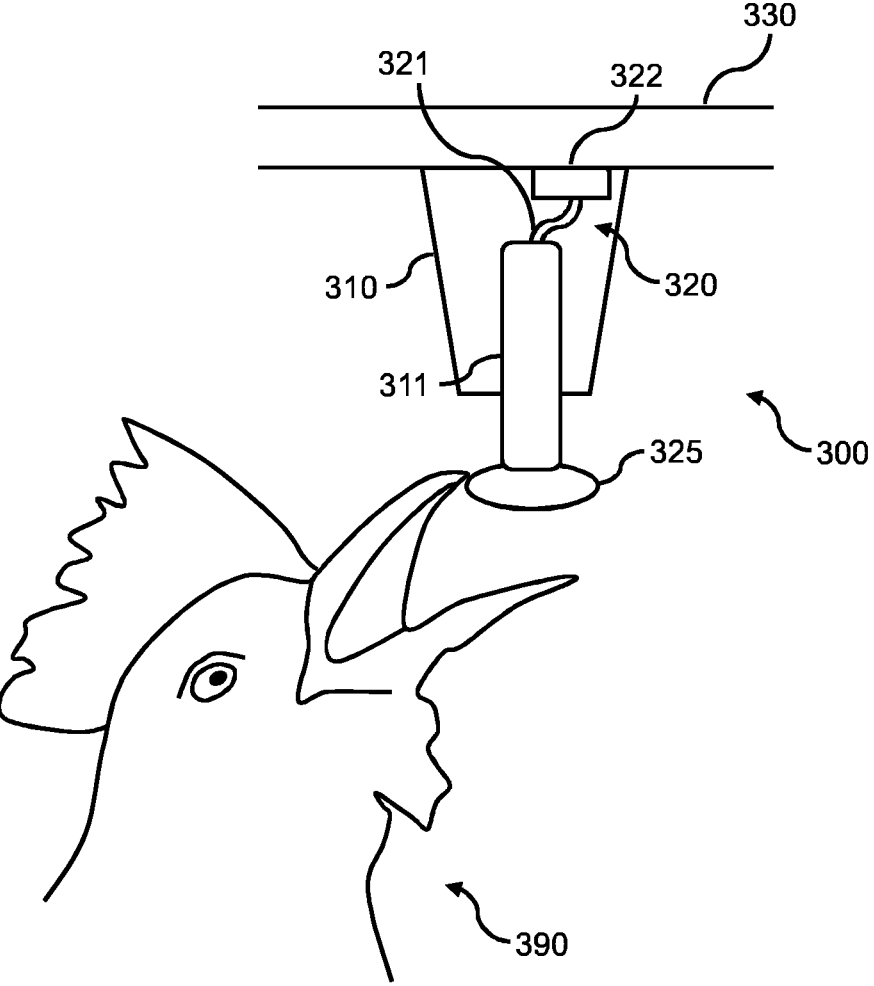
FIG. 3 illustrates a consumable product system according to another embodiment.

FIG. 3 illustrates a consumable product system 300 according to another embodiment. The consumable product system 300 again comprises a consumable product provider 310 and an ultraviolet lighting system 320.

The consumable product provider 310 again comprises a nipple 311 for delivering liquid to the livestock animal 390. The nipple 311 may be fluidly connected to a water/liquid line 330 that carries water (or another liquid) for provision to the livestock animal.

The ultraviolet lighting system 320 comprises a light guide 321 configured to guide the ultraviolet light (e.g., generated by an ultraviolet light source 322) towards an inner part of a mouth or beak of the livestock animal whilst the livestock animal is consuming consumable product at the consumable product provider. The light guide 321 may be at least partially formed of the nipple 311 itself.

In this embodiment, via the light guide 321, targeted UV light exposure of the inner parts of the mouth/beak is achieved (e.g., towards the inner cheek, tongue). A liquid droplet 325 (e.g., a water droplet) produced by the consumable product provider 310 for consumption also acts to guide light towards the inside of the beak/mouth, improving the performance of the ultraviolet lighting system 320 in stimulating the product of vitamin D.

As the inner side of the mouth is also lined with oral mucosa, and therefore epidermal cells, photochemical vitamin-D generation is triggered inside the mouth/beak.

This approach also reduces the exposure of ultraviolet light externally to the livestock animal, thereby reducing potential damage to apparatus and/or undesirable illumination of other livestock animals (e.g., not currently consuming consumable product), which might otherwise lead to excess ultraviolet illumination. This approach also reduces a chance of ultraviolet light illuminating the eyes of the livestock animal, avoiding potential damage to the eyes.

In some examples, the ultraviolet lighting system may be configured so that more than 50% (e.g., more than 75%, e.g., more than 90%) of ultraviolet light emitted by the ultraviolet lighting system is incident to the inside of the beak/mouth of the livestock animal consuming consumable product at the consumable product provider.

As illustrated, the ultraviolet lighting system 320 may be integrated into the consumable product provider 310. However, in other examples, the ultraviolet lighting system may be at least partially formed externally to the consumable product provider 310.

Figure 4:
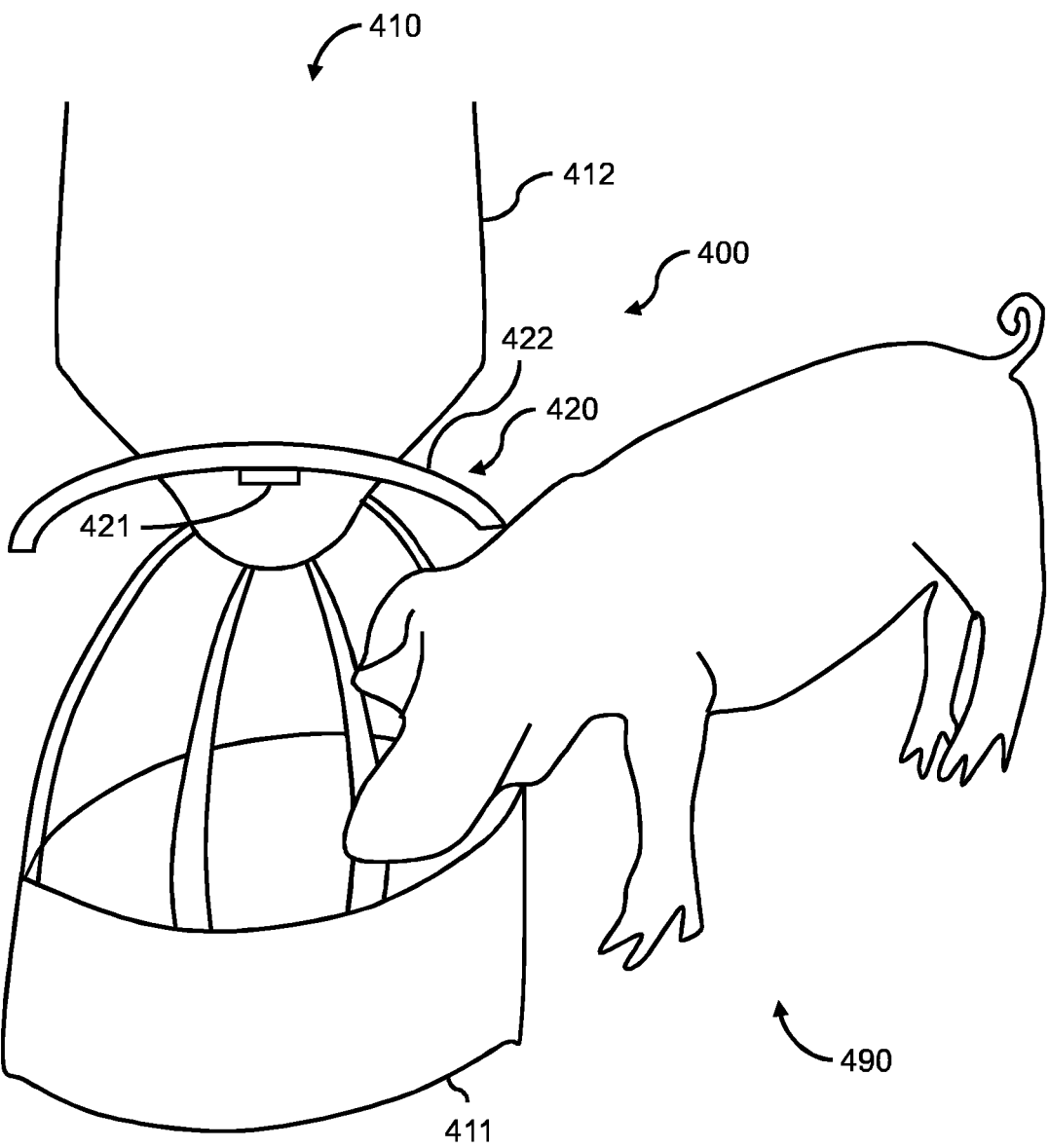
FIG. 4 illustrates a consumable product system according to yet another embodiment.

FIG. 4 illustrates a consumable product system 400 according to yet another embodiment. The consumable product system 400 again comprises a consumable product provider 410 and an ultraviolet lighting system 420.

In this embodiment, the consumable product provider 410 comprises a trough 411 or feeder that holds or houses food for consumption by a livestock animal 490 (here: a pig). The consumable product provider may comprise a food dispenser 412 for dispensing food into the trough or feeder, e.g. according to well-established control systems such as those that employ periodic or remotely controlled dispensing of food.

The ultraviolet lighting system 420 is configured to emit and direct ultraviolet light towards the portion of the livestock animal consuming consumable product at the consumable product provider and/or proximate to the consumable product provider.

The illustrated ultraviolet lighting system 420 comprises an ultraviolet light source 421 and a downwards reflector 422 to direct the ultraviolet light towards feeding livestock (i.e., livestock that are consuming the consumable product).

The ultraviolet lighting system may be configured to direct emitted ultraviolet light to the portion of the livestock animal consuming consumable product at the consumable product provider and/or is proximate to the consumable product provider (e.g., within 1 m of the consumable product provider).

In some examples, the ultraviolet lighting system may be configured so that more than 50% (e.g., more than 75%, e.g., more than 90%) of ultraviolet light emitted by the ultraviolet lighting system is incident upon the portion of the livestock animal consuming consumable product at the consumable product provider and/or proximate to the consumable product provider.

The ultraviolet lighting system 420 may be adapted, like the ultraviolet lighting system 120 described with reference to FIG. 1, to direct light towards a particular portion of the livestock animal whilst the livestock animal is consuming consumable product at the consumable product provider.

Figure 5:
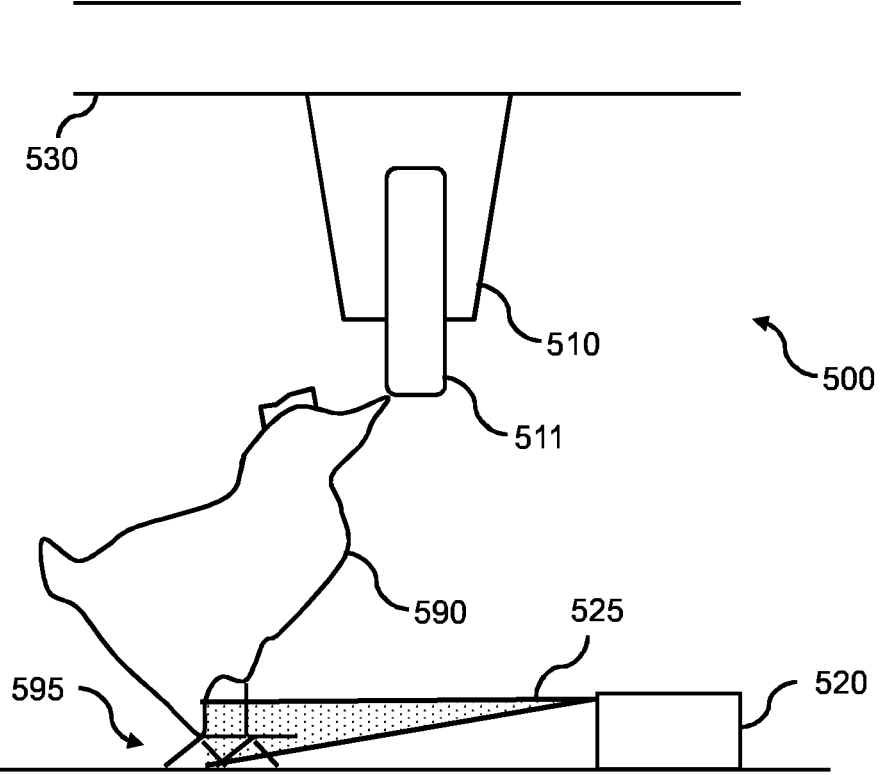
FIG. 5 illustrates a consumable product system according to another embodiment.

FIG. 5 illustrates another embodiment of a consumable product system 500 for a livestock animal. The consumable product system 500 again comprises a consumable product provider 510 and an ultraviolet lighting system 520.

Thus, the consumable product provider 510 is configured to provide consumable product for consumption by a livestock animal 590 (e.g., a chicken or other poultry animal). The illustrated consumable product provider 510 is similar to the consumable product provider 110 described with reference to FIG. 1.

Thus, the consumable product provider 510 comprises a nipple 511 that provides water or other liquid(s) to the livestock animal 590. In particular, the consumable product provider 510 is fluidly connected to a water/liquid line 530 that carries water (or another liquid). The livestock animal 590 is able to interact with the nipple 511 to cause the release of water from the consumable product provider 510.

However, the consumable product provider 510 may be replaced with another form of consumable product provider, e.g., a feed trough or the like.

The ultraviolet lighting system 520 is configured to illuminate a portion 595 of the livestock animal 590 with ultraviolet light 525 whilst the livestock animal is consuming consumable product at the consumable product provider and/or is proximate to the consumable product provider. The illuminated portion of the livestock animal comprises or consists of the legs (e.g. shank(s)) and/or feet of the livestock animal.

By way of example, the ultraviolet lighting system may be configured to direct emitted ultraviolet light to the foot/feet, leg(s) and/or shank(s) of the livestock animal consuming consumable product at the consumable product provider and/or is proximate to the consumable product provider (e.g., within 1 m of the consumable product provider).

In some examples, the ultraviolet lighting system may be configured so that more than 50% (e.g., more than 75%, e.g., more than 90%) of ultraviolet light emitted by the ultraviolet lighting system is incident upon the foot/feet, leg(s) and/or shank(s) of the livestock animal consuming consumable product at the consumable product provider and/or proximate to the consumable product provider.

The ultraviolet lighting system 520 may be restricted to only emit ultraviolet light 525 up to a height of no more than X mm from a ground surface. The value for X should be chosen to be less than the length (along a vertical axis) of the livestock animal's leg or shank. It will be appreciated that the value for X may depend upon the type, species, age or breed of livestock animal (as different livestock animals will have different leg lengths etc.).

Adekoya, K. O., et al. "Morphological characterization of five Nigerian indigenous chicken types." (2013) provide some example measurements for the length of a chicken's shank for different breed/types of chicken. The skilled person would readily appreciate that other breeds and/or types and/or ages would have varying lengths.

Approaches for controlling the spread and/or direction of light are well known in the art, and typically employ one or more suitably configured beamformers, lenses, mirrors and/or shielding elements to control the direction of light emitted by a light system.

Directing light towards a livestock animal's leg(s), shank(s) or foot/feet is particularly advantageous as these areas act as good exposure zones to ultraviolet light, being areas that are less covered by feathers or fur whilst still carrying vitamin-D producing cells. Moreover, targeting the legs/shanks/feet would reduce a risk of eye exposure/eye damage that may result from ultraviolet light, further improving or maintaining the welfare of the livestock animal.

Figure 6:
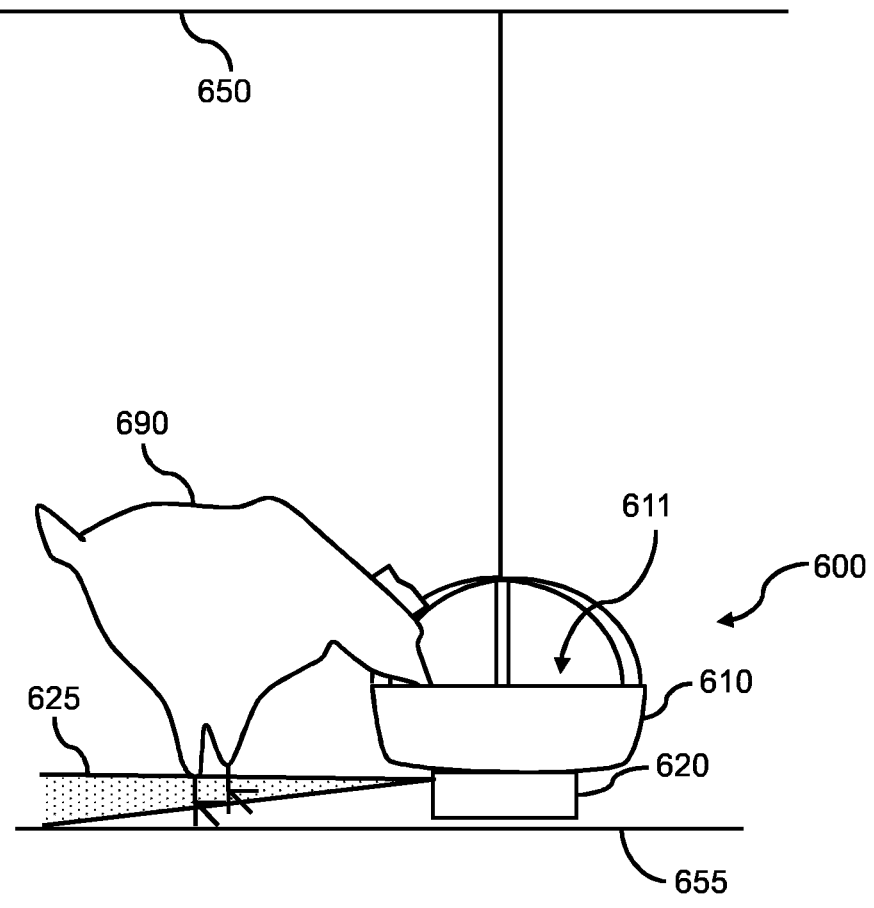
FIG. 6 illustrates a consumable product system according to another embodiment.

FIG. 6 illustrates a variation to the consumable product system illustrated and described with reference to FIG. 5.

In this embodiment, the consumable product provider 610 of the consumable product system 600 comprises a trough 611 or feeder (e.g., containing feed or food for the livestock animal), rather than a liquid provider such as a nipple. Thus, the livestock animal 690 is able to consume or eat food from the trough or feeder of the consumable product provider 610. Of course, the trough or feeder could be filled with liquid.

The ultraviolet lighting system 620 may be connected or attached to such a trough or feeder, e.g., to an underside of the trough or feeder forming the consumable product provider 610. This more appropriately positions the ultraviolet lighting system so that emitted ultraviolet light 625 illuminates the leg(s), shank(s) and/or foot/feet of the livestock animal 690.

Arranging the ultraviolet lighting system in this way further reduces a chance of ultraviolet light being emitted towards the eyes of the livestock animal, e.g., as the consumable product system 600 can act to block the emission of light in an upward direction (e.g., towards the eyes). The consumable product system 600 can thereby contribute to the directing of the ultraviolet radiation.

Arranging the ultraviolet lighting system 620 in this way also raises the lighting system from the floor or ground. This reduces a likelihood of damage to the ultraviolet lighting system (e.g., from excrement (e.g., urine or feces), flooding or the like).

Arranging the ultraviolet lighting system in this further also reduces a likelihood that the livestock animal will be able to interact or engage with the ultraviolet lighting system (e.g., by stepping or pecking it). This thereby improves the likely longevity of the ultraviolet lighting system.

The ultraviolet light system 620 may be otherwise embodied as previously described, e.g., with reference to FIG. 5.

The illustrated consumable product provider 610 comprises a suspended feeder or trough 611, e.g., a provider 610 that is suspended from a ceiling 650 or upper covering. However, such a provider 610 could instead be replaced by a free-standing or floor-standing feeder or trough—e.g., comprises a plurality of legs or supports for supporting the trough against a ground surface 655.

The consumable product provider 610 may comprise a food dispenser (not shown) for dispensing food into the trough or feeder, e.g. according to well-established control systems such as those that employ periodic or remotely controlled dispensing of food.

In all embodiments, the ultraviolet lighting system is configured to emit ultraviolet light having a peak intensity at a wavelength of from 280 nm to 320 nm. The further optional features and explanation described with reference to FIG. 2 may apply to any embodiment of the invention.

The skilled person would readily appreciate various techniques and mechanisms for controlling the magnitude or amount of ultraviolet light that is directed, by the ultraviolet lighting system, towards a livestock animal consuming consumable product at the consumable product provider and/or is proximate to the consumable product provider. This can be achieved through appropriate configuration and placement of the ultraviolet lighting system with respect to the livestock animal.

For instance, the closer the output of the ultraviolet lighting system to the livestock animal, the greater the intensity of illumination on the animal. Similarly, a reduced beam spread (e.g., using reflectors) can increase the intensity of illumination on the animal.

The ultraviolet light system may be configured to, whilst the livestock animal is consuming consumable product at the consumable product provider, illuminate the portion of the livestock animal with ultraviolet light having an irradiance, on the portion of the livestock animal, less than 0.1 W/m$^2$, e.g. less than 0.08 W/m$^2$, e.g., less than 0.05 W/m$^2$, e.g., less than or equal to 0.01 W/m$^2$.

The ultraviolet light system may be configured to, whilst the livestock animal is consuming consumable product at the consumable product provider, illuminate the portion of the livestock animal with ultraviolet light having an irradiance, on the portion of the livestock animal, greater than 0.001 W/m$^2$, e.g., greater than 0.002 W/m$^2$, e.g., greater than 0.005 W/m$^2$, e.g., greater than 0.009 W/m$^2$.

Purely by way of working example, for chickens, a suitable irradiance value may be in the region of between 0.005 W/m$^2$ and 0.01 W/m$^2$. This has been experimentally identified as being a suitable irradiance value for achieving good Vitamin-D production in chickens over a period at which they will be at the consumable product provider, whilst reducing a chance of damaging the chicken(s) with ultraviolet light.

It will be appreciated that the precise value for the irradiance may depend, for instance, upon the type, breed, age and/or species of animal. It is recognized that the recommended exposure limit or exposure amount for different types/breeds/ages/species of animal are different.

For instance, Barnkob, Line Lundbaek, et al. "Vitamin D enhanced pork from pigs exposed to artificial UVB light in indoor facilities." European Food Research and Technology 245.2 (2019): 411-418 provides recommended exposure limits or exposure amounts for swine. Kühn, Julia, et al. "Non-linear increase of vitamin D content in eggs from chicks treated with increasing exposure times of ultraviolet light." The Journal of steroid biochemistry and molecular biology 148 (2015): 7-13 provides information on the response of Vitamin D amounts in chickens/eggs from different exposure levels to ultraviolet light. Other suitable investigations have been performed on other types of animals.

Based on the teaching that the livestock animal is likely to visit the consumable product provider for a set or estimated period everyday, the skilled person would be readily capable of selecting illuminance values for achieving a desired exposure amount (e.g., measured in J/m$^2$ or SED) for the type, breed, age and/or species of animal.

Approaches for measuring or monitoring an irradiance are well known to the skilled person, and could employ modelling approaches such as computer-modelling approaches (e.g., with a model of the livestock animal and the ultraviolet light system). Another approach is to use a light meter, such as that described in Gehrmann, William H. "Ultraviolet irradiances of various lamps used in animal husbandry." Zoo biology 6.2 (1987): 117-127.

In some examples, the ultraviolet light system may be configured to, whilst the livestock animal is consuming consumable product at the consumable product provider, illuminate the portion of the livestock animal with ultraviolet light having an illuminance, on the portion of the livestock animal, of no more than 50 lux, preferably no more than 25 lux, preferably no more than 15 lux.

In some examples, the ultraviolet light system may be configured to, whilst the livestock animal is consuming consumable product at the consumable product provider, illuminate the portion of the livestock animal with ultraviolet light having an illuminance, on the portion of the livestock animal, of no less than 1 lux, preferably no less than 5 lux, preferably no less than 10 lux.

These values have been identified, for typical ultraviolet light systems, of providing suitable irradiance or illuminance of the livestock animal to achieve a desired exposure or dose of ultraviolet light.

Figure 7:
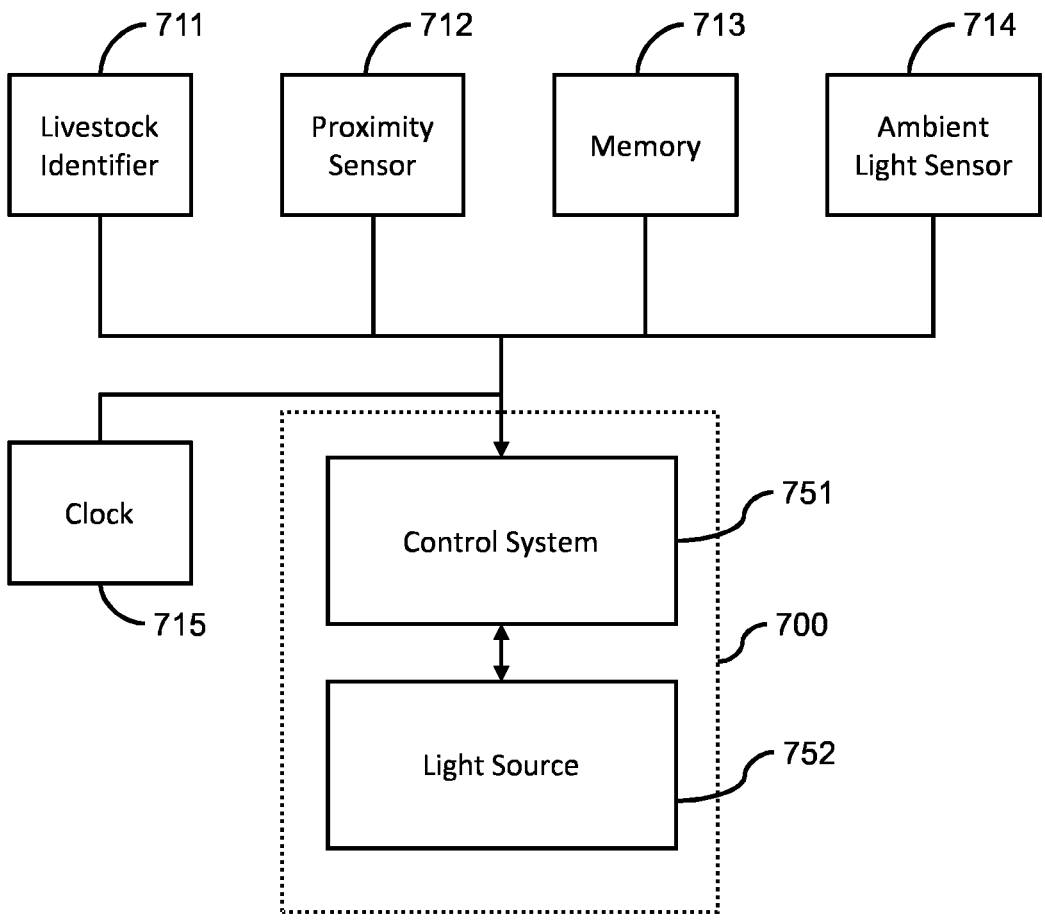
FIG. 7 illustrates an ultraviolet lighting system for use in embodiments.

FIG. 7 is a block diagram illustrating an ultraviolet lighting system 700 for use in embodiments of the invention, e.g., any above described embodiment of a consumable product system. The ultraviolet lighting system is configured to control one or more properties of the ultraviolet light responsive to one or more input parameters, each of which may be provided by a respective input module.

In some examples, the ultraviolet lighting system thereby comprises a control system 751 and a light source 752 for outputting or emitting ultraviolet light. The control system 751 is configured to control an operation of the light source 752.

One example of an input module is a livestock identifier 711 configured to determine an identity of the livestock animal. The livestock identifier 711 may, for instance, comprise a camera or image sensor and an image processing unit configured to process an image taken by the camera to identify the livestock animal. As another example, the livestock identifier 710 may comprise a tag scanner or reader (e.g., RFID reader) configured to read a tag carried/worn by the livestock animal, such as an ear tag.

The (control system 751 of the) ultraviolet lighting system 700 may be configured to control one or more properties of the ultraviolet light responsive to the determined identity of the livestock animal. In this way, the ultraviolet lighting system may be able to provide bespoke or animal-specific control of ultraviolet light.

For instance, the control system may be able to track an amount (or predicted amount) of ultraviolet light exposure or dose each specific livestock animal has received, and control the operation of the light source 752 to ensure that this does not exceed a desired exposure amount or dose.

Another example of an input module is a proximity sensor 712 or livestock sensor. The proximity/livestock sensor may be configured to sense the presence or absence of the livestock animal within the vicinity of the consumable product provider. Suitable examples of proximity sensors will be apparent to the skilled person, e.g., PIR sensors, image sensors and so on.

The (control system 751 of the) ultraviolet lighting system 700 may be configured to control one or more properties of the ultraviolet light responsive to the determined presence or absence of the livestock animal. For instance, the ultraviolet lighting system 700 may be configured to only emit ultraviolet light responsive to the livestock sensor sensing the presence of the livestock animal within the vicinity of the consumable product provider, thus preventing the emission of ultraviolet light responsive to the livestock sensor sensing the absence of the livestock animal within the vicinity of the consumable product provider.

Another example of an input module is a memory 713. The memory may store information usable for controlling the ultraviolet lighting system, such as a schedule or control scheme for controlling the ultraviolet lighting system. The memory 713 may also collect and hold information on the individual UVB light dose each of the identifiable animals has received, and match that with the desired envisioned dose for each animal.

Another example of an input module is an ambient light sensor 714 configured to sense an ambient light level. The ultraviolet lighting system may be configured to control an amount of ultraviolet light emitted responsive to an ambient light level, e.g., to only output ultraviolet light when an ambient light level exceeds some predetermined threshold. This approach can, for instance, ensure that ultraviolet light is only output by the ultraviolet lighting system during the daytime.

Yet another example of an input module is a clock 715, configured to provide a (current) time to the ultraviolet lighting system. The ultraviolet lighting system may be configured to provide ultraviolet light for a predetermined period of time during the day (e.g., according to a schedule).

Of course, a combination of the input parameters provided a combination of one or more of the input modules may be used.

For instance, the identifier of the livestock and the time may be used to monitor a total or cumulative amount of ultraviolet light provided to a particular livestock animal. The ultraviolet lighting system may be configured such that the cumulative amount of ultraviolet light provided to each particular livestock animal is within a predetermined time period, e.g., between 5 and 60 minutes a day. This can be achieved by, for instance, monitoring the cumulative time period of ultraviolet light received by the livestock animal and responsive to the cumulative time exceeding some predetermined time period, preventing the ultraviolet lighting system from directing ultraviolet light towards the livestock animal.

As previously mentioned, excess ultraviolet illumination might lead to unwanted animal behavior or unwanted damage to the animal (such as skin lesions, sun burns, or eye irritation or damage). Restricting the total or cumulative exposure of the livestock animal to the ultraviolet light in this way can mitigate these effects.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

If the term "adapted to" is used in the claims or description, it is noted the term "adapted to" is intended to be equivalent to the term "configured to". If the term "arrangement" is used in the claims or description, it is noted the term "arrangement" is intended to be equivalent to the term "system", and vice versa. Any reference signs in the claims should not be construed as limiting the scope.

The invention claimed is:

1. A consumable product system configured for illuminating a livestock animal with ultraviolet light comprising:
   a consumable product provider configured to provide a consumable product for consumption by the livestock animal, wherein the consumable product provider defines a consuming zone within which the livestock animal can access the consumable product provided by the consumable product provider, the consuming zone being proximate to the consumable product provider; and
   an ultraviolet lighting system comprising an ultraviolet light source, the ultraviolet lighting system being configured to illuminate a portion of the livestock animal with ultraviolet light produced by the ultraviolet light source whilst the livestock animal is within the consuming zone,
   wherein the ultraviolet light produced by the ultraviolet light source has a peak intensity at a wavelength of from 280 nm to 320 nm;
   wherein the ultraviolet light system is arranged relative to the consumable product provider such that more than 50% of the ultraviolet light emitted by the ultraviolet lighting system is incident upon the portion of the livestock animal within the consuming zone of the consumable product provider;
   wherein the portion of the livestock animal is an inner part of a mouth or beak of the livestock animal, or is a foot, leg, and/or shank of the livestock animal; and
   wherein the livestock animal is a chicken.

2. The consumable product system of claim 1, wherein:
   the portion of the livestock animal is the inner part of the mouth or beak of the livestock animal,
   wherein the consumable product provider comprises a plurality of nipples for delivering the consumable product to the livestock animal, the consumable product being a liquid, and
   wherein the ultraviolet light system is configured to emit the ultraviolet light in or near the plurality of nipples.

3. The consumable product system of claim 1, wherein the ultraviolet lighting system comprises an output surface configured to emit the ultraviolet light produced by the ultraviolet light source, wherein the output surface is positioned relative to the ultraviolet light source and the consumable product provider such that the output surface is located no further than 0.5 m from the consumable product provider.

4. The consumable product system of claim 3, wherein the output surface is positioned relative to the ultraviolet light source and the consumable product provider such that the output surface is located no further than 0.25 m from the consumable product provider.

5. The consumable product system of claim 1, wherein the ultraviolet light system is configured to illuminate the consuming zone with ultraviolet light having an irradiance, on the portion of the livestock animal positioned in the consuming zone, greater than 0.001 W/m$^2$.

6. The consumable product system of claim 5, wherein the ultraviolet light has, on the portion of the livestock animal positioned in the consuming zone, an irradiance of between 0.001 W/m$^2$ and 0.1 W/m$^2$ and an illuminance of no less than 1 lux and no more than 50 lux.

7. The consumable product system of claim 1, further comprising a livestock sensor configured to sense a presence or absence of the livestock animal within a vicinity of the consumable product provider, wherein the ultraviolet lighting system is configured to only emit the ultraviolet light responsive to the livestock sensor sensing the presence of the livestock animal within the vicinity of the consumable product provider.

8. The consumable product system of claim 7, wherein the ultraviolet lighting system is configured to prevent emission of the ultraviolet light responsive to the livestock sensor sensing the absence of the livestock animal within the vicinity of the consumable product provider.

9. The consumable product system of claim 1, wherein:

the consumable product provider comprises a nipple for delivering the consumable product to the livestock animal, the consumable product being a liquid; and the ultraviolet light system is configured to emit the ultraviolet light in or near the nipple.

10. The consumable product system of any claim 9, wherein:

the consumable product provider comprises a plurality of nipples for delivering the consumable product to the livestock animal, the consumable product being a liquid; and the ultraviolet light system is configured to emit the ultraviolet light at a position between the plurality of nipples.

11. The consumable product system of claim 1, wherein the ultraviolet light has a peak intensity at a wavelength of from 280 nm to 315 nm.

12. The consumable product system of claim 1, wherein the ultraviolet light system comprises a light guide configured to guide the ultraviolet light towards the inner part of the mouth or beak of the livestock animal whilst the livestock animal is consuming the consumable product provided by the consumable product provider.

13. The consumable product system of claim 1, further comprising a livestock identifier configured to determine an identity of the livestock animal, wherein the ultraviolet lighting system is configured to control one or more properties of the ultraviolet light responsive to the determined identity of the livestock animal.

14. The consumable product system of claim 1, wherein the consumable product provider comprises a trough for providing feed to the livestock animal.

15. The consumable product system of claim 1, wherein the ultraviolet lighting system comprises one or more beamformers, lenses, mirrors, and/or shielding elements arranged relative to the consuming zone of the consumable product provider to direct more than 75% of the ultraviolet light emitted by the ultraviolet lighting system to the portion of the livestock animal within the consuming zone of the consumable product provider.

16. A consumable product system configured for illuminating a livestock animal with ultraviolet light comprising:

a consumable product provider configured to provide a consumable product for consumption by the livestock animal, wherein the consumable product provider defines a consuming zone within which the livestock animal can access the consumable product provided by the consumable product provider, the consuming zone being proximate to the consumable product provider; and an ultraviolet lighting system comprising an ultraviolet light source, the ultraviolet lighting system being configured to illuminate a portion of the livestock animal with ultraviolet light produced by the ultraviolet light source whilst the livestock animal is within the consuming zone, wherein the ultraviolet light produced by the ultraviolet light source has a peak intensity at a wavelength of from 280 nm to 320 nm;

wherein the ultraviolet light system is arranged relative to the consumable product provider such that more than 90% of the ultraviolet light emitted by the ultraviolet lighting system is incident upon the portion of the livestock animal within the consuming zone of the consumable product provider; and wherein the portion of the livestock animal illuminated by the ultraviolet light is an inner part of a mouth or beak of the livestock animal, is a cheek of the livestock animal, or is a foot, leg, and/or shank of the livestock animal.

17. The consumable product system of claim 16, wherein the ultraviolet lighting system comprises an output surface configured to emit the ultraviolet light produced by the ultraviolet light source, wherein the output surface is positioned relative to the ultraviolet light source and the consumable product provider such that the output surface is located no further than 0.25 m from a location at which the consumable product is made available for consumption.

18. The consumable product system of claim 16, wherein the ultraviolet light has, on the portion of the livestock animal positioned in the consuming zone, an irradiance of between 0.001 W/m$^2$ and 0.1 W/m$^2$ and an illuminance of no less than 1 lux and no more than 50 lux.

19. The consumable product system of claim 16, further comprising a livestock identifier configured to determine an identity of the livestock animal and to monitor a total or cumulative amount of ultraviolet light provided to the livestock animal;

wherein the ultraviolet lighting system comprises a control system configured to control the emissions of ultraviolet light responsive to the total or cumulative amount of ultraviolet light provided to the livestock animal.

20. The consumable product system of claim 16, further comprising a livestock sensor configured to sense a presence or absence of the livestock animal within a vicinity of the consumable product provider, wherein the ultraviolet lighting system is configured to prevent emission of the ultraviolet light responsive to the livestock sensor sensing the absence of the livestock animal within the vicinity of the consumable product provider.

* * * * *